UNITED STATES PATENT OFFICE.

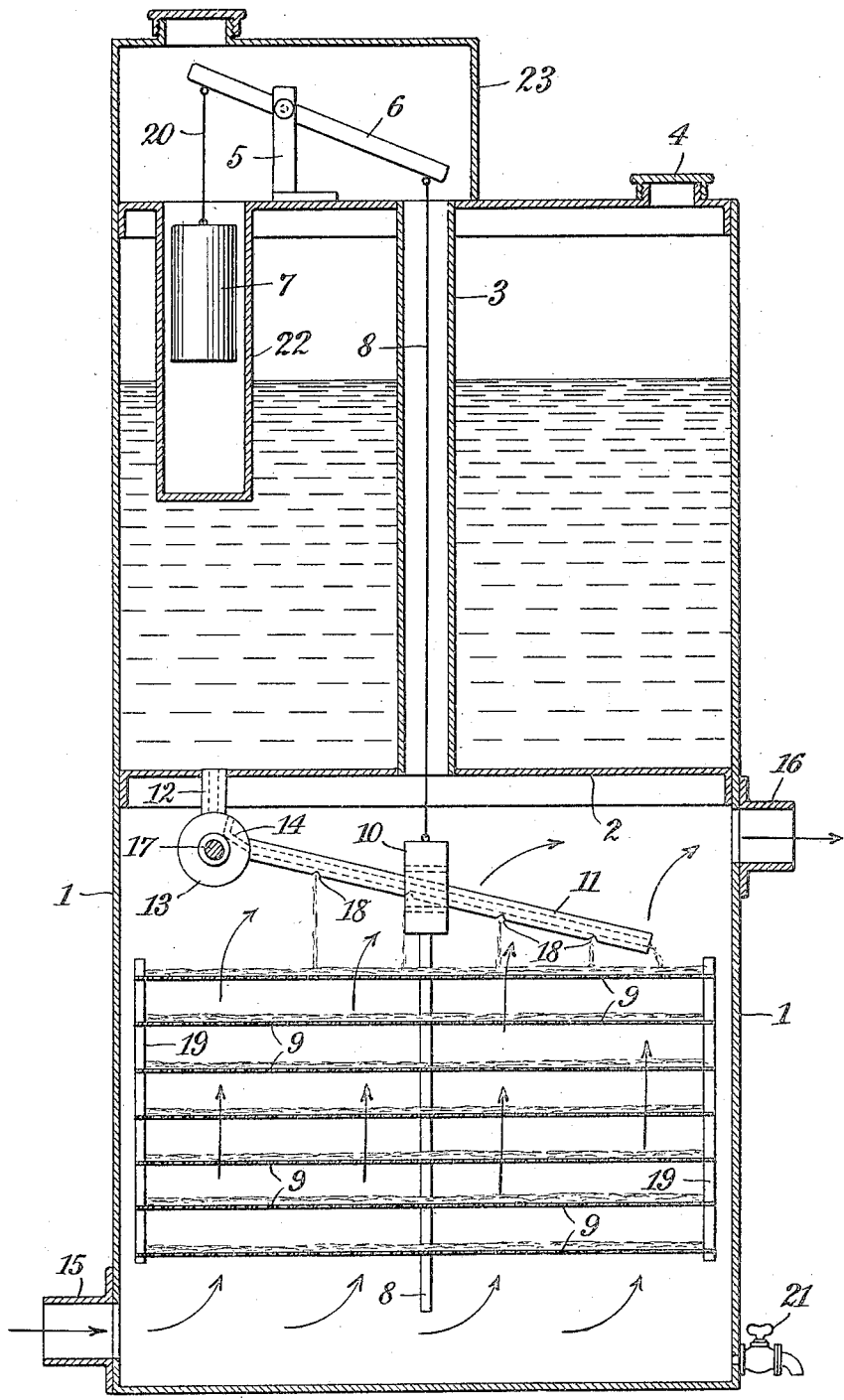

GUSTAV TRESENREUTER, OF BERLIN, GERMANY, ASSIGNOR TO FRANZ GLINICKE, OF BERLIN, GERMANY.

CARBURETER.

No. 818,397. Specification of Letters Patent. Patented April 17, 1906.

Application filed May 20, 1905. Serial No. 261,373.

*To all whom it may concern:*

Be it known that I, GUSTAV TRESENREUTER, a citizen of the Empire of Germany, residing at Berlin, in the Empire of Germany, have invented a new and useful Carbureter, of which the following is a specification.

The hitherto-known gas-carbureters essentially present two difficulties—viz., first, the exact regulation of the admission of the liquid hydrocarburet, and, second, the elimination of the water contained to a not inconsiderable degree both in the gas and in the benzol or in a similar hydrocarburet.

My invention relates to improvements in carbureters whereby the proportion between the gas and the hydrocarburet is precisely regulated and the water is automatically eliminated from both the gas and the hydrocarburet.

The objects of my improvement are, first, to provide a tank or vessel which by a horizontal partition is divided into a liquid-storage chamber above and a carbureting-chamber below; second, to provide in the lower chamber a frame with a plurality of superposed horizontal sieves filled with layers of glass-wool, which frame is attached to a slotted cross-head; third, to balance this frame with the horizontal sieves and the slotted cross-head by means of a two-armed lever and a counterweight at the top of the vessel and a rod or chain, and, fourth, to provide at the top of the lower chamber a cock or similar valve the plug of which or its equivalent is rigidly connected with a hollow lever engaging in the slot of the slotted cross-head. I attain these objects by the improved carbureter illustrated in the accompanying drawing, which shows a vertical central section through the same.

The carbureter is a vessel 1, which by a horizontal partition 2 is divided into the liquid-storage chamber above and the carbureting-chamber below. To the partition 2 is attached a vertical outlet 12, beneath which a disk 13 is mounted to turn on a horizontal pin 17, suspended from the partition 2. This disk 13 is similar to the plug of a cock, as it is provided with a bent channel 14, the upper end of which can register with the outlet 12. It is rigidly connected with a hollow lever 11, which on its lower side may be provided with several holes 18 18. This lever 11 engages in the slot of a cross-head 10. A suitable frame 19 8 with a plurality of superposed horizontal sieves 9 9 is disposed within the lower chamber, and the frame 19 8 is connected with the cross-head 10 in any known manner. Layers of glass-wool are placed on the several sieves 9 9. These sieves have nearly the same size as the inside of the reservoir 1. The carbureting-chamber is provided with an inlet 15 below and an outlet 16 above. The several sieves 9 9, with the frame 19 8, the cross-head 10, and the hollow lever 11, are so balanced by a counterweight 7, with the aid of a two-armed lever 6 and wires 8 and 20 or chains, that when the glass-wool layers contain little hydrocarburet the sieves 9 9 are drawn upward, and therewith also the lever 11. A water-discharging cock or valve 21 is attached to the vessel 1 close to its bottom. The wire 8 or chain passes through a central vertical tube 3, and the two-armed lever 6 is shown as carried by a convenient support 5, while the counterweight 7 is shown as arranged within a pocket 22, which is fastened at the top of the vessel. A box 23 incloses the two-armed lever 20 and communicates on the one hand with the pocket 22 and on the other hand through the tube 3 with the carbureting-chamber. The top of the vessel 1 is provided with a charging-cover 4.

The carbureter described so far is operated as follows: Normally the frame 19 8, with the several horizontal sieves 9 9, the cross-head 10, and the lever 11, occupy the uppermost position in which the upper end of the bent channel 14 in the disk 13 registers with the outlet 12. The cover 4 is taken off and the hydrocarburet, such as benzol or the like, is introduced into the storage-chamber above the partition 2, after which the cover 4 is replaced. The hydrocarburet flows from the storage-chamber through the outlet 12, the bent channel 14, the cavity of the hollow lever 11, and the holes 18 18, also the end of the lever 11 to the layer of glass-wool on the uppermost sieve 9, through which it percolates. The liquid then passes to the layer of glass-wool on the next following sieve 9, and thence consecutively to the following layers of glass-wool. Of course, the sieves 9 9 will be thereby rendered heavier, so that they, with the frame 19 8, the slotted cross-head 10, and the lever 11, outbalance the counterweight 7 and go downward, so that the supply of hydrocarburet from the storage-chamber above to the carbureting-chamber below is stopped. The glass-wool has the property of absorbing the benzol or other hydrocarburet alone, while it permits the water contained therein and also the water afterward admitted with the gas to escape by percolating through the several layers and by dripping. The capillarity of the glass-wool is great, and the water eliminated in not inconsiderable quantities never decreases the active surface of the sieves 9 9 and the layers, so that this active surface remains constant and insures a uniform carburation of the gas. After the gas has been turned on in any known manner it enters through the inlet 15 the carbureting-chamber and passes upward around the several sieves 9 9 and layers of glass-wool, while being gradually carbureted. The carbureted gas escapes through the outlet 16 and a convenient pipe or pipe system to the various places of consumption. The water collecting on the bottom of the carbureting-chamber may be discharged from time to time through the cock or valve 21. When in the course of a certain period the weight of the frame 19 8, with the sieves 9 9 and the layers of glass-wool, the cross-head 10, and the hollow lever 11 decreases owing to the evaporation of the hydrocarburet, the said parts will be drawn upward by the counterweight 7, whereupon a fresh quantity of hydrocarburet will be permitted to flow from the storage-chamber to the carbureting-chamber in the manner described above. Thus the carbureter will act automatically and furnish a uniformly-carbureted gas.

The carbureter may be varied without deviating from the spirit of my invention.

What I claim as my invention, and desire to secure by Letters Patent, is—

1. In a carbureter of the class described, the combination with a vessel, of a horizontal partition dividing said vessel into a liquid-storage chamber above and a carbureting-chamber below, a frame in said carbureting-chamber, a plurality of superposed horizontal sieves arranged in said frame and provided with layers of glass-wool, a slotted cross-head at the top of said frame, an outlet in said horizontal partition, a horizontal pin suspended from said horizontal partition, a disk provided with a bent channel and mounted to turn on said horizontal pin close to said outlet, so that the one end of its channel may register with said outlet, a hollow lever rigidly connected with said disk and engaging in the slot of said slotted cross-head, the cavity of this lever communicating with the other end of the bent channel in said disk, means for outbalancing said frame with the parts connected therewith, when there is no hydrocarburet in the layers of glass-wool, a supply-conduit for gas near the bottom of said carbureting-chamber, and a carbureted gas-outlet at the top of said carbureting-chamber.

2. In a carbureter of the class described, the combination with a closed vessel, of a horizontal partition dividing said vessel into a liquid-storage chamber above and a carbureting-chamber below, a vertical tube extending from said horizontal partition to the top of said closed vessel, a box on the top of said closed vessel and communicating with said vertical tube, a pocket attached from below to the top of said closed vessel and communicating with said box, a support in said box, a two-armed lever mounted in said support to turn, a frame in said carbureting-chamber, a plurality of superposed horizontal sieves arranged in said frame and provided with layers of glass-wool, a slotted cross-head at the top of said frame, an outlet in said horizontal partition, a horizontal pin suspended from said horizontal partition, a disk provided with a bent channel and mounted to turn on said horizontal pin close to said outlet, so that the one end of its channel may register with said outlet, a hollow lever rigidly connected with said disk and engaging in the slot of said slotted cross-head, the cavity of this lever communicating with the other end of the bent channel in said disk, a rod or chain connecting said slotted cross-head with the one end of said two-armed lever through said vertical tube, a counterweight suspended from the other end of said two-armed lever and playing within said pocket and arranged to outbalance said frame with said plurality of superposed horizontal sieves and layers of glass-wool, said slotted cross-head and said hollow lever, when there is little hydrocarburet in the glass-wool, a supply-conduit for gas near the bottom of said carbureting-chamber, and a carbureted gas-outlet at the top of said carbureting-chamber.

In testimony whereof I have signed my name to this specification in the presence of two subscribing witnesses.

GUSTAV TRESENREUTER.

Witnesses:
WOLDEMAR HAUPT,
HENRY HASPER.